(12) United States Patent
Wu

(10) Patent No.: US 11,750,038 B2
(45) Date of Patent: Sep. 5, 2023

(54) MICRO-ENERGY ACQUISITION DEVICE AND MICRO-ENERGY ACQUISITION METHOD

(71) Applicant: Wenjing Wu, Guangdong (CN)

(72) Inventor: Wenjing Wu, Guangdong (CN)

( * ) Notice: Subject to any disclaimer, the term of this patent is extended or adjusted under 35 U.S.C. 154(b) by 0 days.

(21) Appl. No.: 17/828,779

(22) Filed: May 31, 2022

(65) Prior Publication Data

US 2022/0294268 A1 Sep. 15, 2022

Related U.S. Application Data

(63) Continuation-in-part of application No. PCT/CN2019/123361, filed on Dec. 5, 2019.

(51) Int. Cl.
*H02J 50/20* (2016.01)

(52) U.S. Cl.
CPC .................. *H02J 50/20* (2016.02)

(58) Field of Classification Search
CPC ...... H02J 50/20; H02J 50/001; H02J 7/00711; H02J 7/35; H02J 2207/20; H02J 7/00036; H02J 7/00047; H02J 7/0034; H02J 7/02; H02J 50/005; H02J 50/05; H02J 50/10; H02J 50/12; H02J 7/0042; H02J 7/007; H02J 7/342; H02J 7/345; Y02D 30/70; H04B 1/40; H01M 10/44; H01M 10/4257;

(Continued)

(56) References Cited

U.S. PATENT DOCUMENTS 9,349,319 B2 5/2016 Wu et al.
9,929,698 B2 * 3/2018 Gudem .................. H03F 1/523
(Continued)

FOREIGN PATENT DOCUMENTS

CN 102651198 A 8/2012
CN 103400558 A 11/2013
(Continued)

OTHER PUBLICATIONS

International Search Report for International Application No. PCT/CN2019/123361; Date of Completion: Aug. 5, 2020; dated Aug. 28, 2020; 5 Pages.

(Continued)

*Primary Examiner* — John W Poos
*Assistant Examiner* — Tyler J Pereny
(74) *Attorney, Agent, or Firm* — CANTOR COLBURN LLP

(57) ABSTRACT

A micro-energy acquisition device is provided. The radio frequency circuit generates a ground voltage according to the micro-energy voltage and output the ground voltage through the ground terminal; the first unidirectional conduction component makes the ground voltage to be unidirectionally conductive to generate the first voltage; the microprocessor generates the supply voltage according to the first voltage and is operated according to the supply voltage; the first input/output port of the microprocessor is connected with the first unidirectional conduction component; since the microprocessor and the radio frequency circuit are connected in series, an electrical energy consumption speed of the micro-energy voltage is slower, the capability of data transmission is improved and an error rate of data transmission is reduced.

14 Claims, 5 Drawing Sheets

(58) Field of Classification Search
CPC ......... H01M 10/4207; H01M 10/4264; H01M 10/46; H02M 3/285; H02M 3/33571; H02M 3/3385; H02M 7/043; H02M 3/338; H02M 7/103

See application file for complete search history.

(56) References Cited

U.S. PATENT DOCUMENTS

| | | | |
|---|---|---|---|
| 2012/0313612 A1* | 12/2012 | Schneider | G05F 1/67 323/311 |
| 2013/0155742 A1* | 6/2013 | Lee | H02M 7/103 363/126 |
| 2019/0148795 A1 | 5/2019 | Hawley et al. | |
| 2019/0214825 A1 | 7/2019 | Hua | |
| 2020/0235672 A1* | 7/2020 | Bieber | H02M 3/33538 |

FOREIGN PATENT DOCUMENTS

| | | |
|---|---|---|
| CN | 103580290 A | 2/2014 |
| CN | 104155892 A | 11/2014 |
| CN | 204013475 U | 12/2014 |
| CN | 204441965 U | 7/2015 |
| CN | 106611924 A | 5/2017 |
| CN | 207573330 U | 7/2018 |
| CN | 109039325 A | 12/2018 |
| WO | 2018112748 A1 | 6/2018 |

OTHER PUBLICATIONS

Translation of International Search Report for International Application No. PCT/CN2019/123361; Date of Completion Aug. 5, 2020; dated Aug. 28, 2020; 3 Pages.

Written Opinion for International Application No. PCT/CN2019/123361; Date of Completion: Aug. 24, 2020; dated Aug. 28, 2020; 4 Pages.

First Chinese Office Action dated Dec. 15, 2022; CN Application No. 201980002843.6; 7 pages (Non-English).

Kai, C. et al. "Novel low-frequency energy collection system based on supercapacitors", Power Supply Technology and its Application, 2018, 4 pages (English Abstract).

Shu, J. et al. "Design and implementation of vibration energy collection module based on SECE", 1009-2552 (2017) 06-0177-04 (English Abstract).

* cited by examiner

MICRO-ENERGY ACQUISITION DEVICE AND MICRO-ENERGY ACQUISITION METHOD

CROSS-REFERENCE TO RELATED APPLICATION

This application is a continuation-in-part of PCT application No. PCT Application No. PCT/CN2019/123361 filed on Dec. 5, 2019, the entire contents of which are incorporated herein by reference.

FIELD

The present application relates to the field of energy acquisition and conversion, and particularly relates to a micro-energy acquisition device and a micro-energy acquisition method.

BACKGROUND

Micro-energy voltage of a conventional micro-energy acquisition device is input into a power terminal of a microprocessor and a power terminal of a radio frequency circuit respectively, the microprocessor generates a data signal according to the micro-energy voltage and outputs the data signal through a second input/output port thereof; the radio frequency circuit generates a wireless communication signal according to the micro-energy voltage and the data signal, and transmits the wireless communication signal over a wireless link. Due to the fact that signal conversion and transmission of wireless communication signal can only be performed after crystal oscillator is powered up, parameters are configured, a phase-locked loop and a power amplifier are powered up. Since the microprocessor and the radio frequency circuit are connected in parallel, so that a power consumption speed of electric energy is fast; in actual operation, an electrical energy maintenance time of the micro-energy voltage in RF code-transmitting state is only 170 μs; thus, the micro-energy voltage cannot provide the radio frequency circuit with enough energy for transmitting complete data packet in the manner of wireless communication signal, and deficiencies of weak capability of data transmission and high error rate of data transmission are caused accordingly.

SUMMARY

The present application provides a micro-energy acquisition device and a micro-energy acquisition method, which aims to solve a problem in the conventional micro-energy acquisition device that a power consumption speed of electric energy is fast since the microprocessor and the radio frequency circuit are connected in series, the micro-energy voltage cannot provide the radio frequency circuit with enough energy for transmitting complete data packet in the manner of wireless communication signal, thus, the deficiencies of weak capability of data transmission and high error rate of data transmission are caused.

The present application is implemented by providing a micro-energy acquisition device, including:

a radio frequency circuit configured to generate a ground voltage according to a micro-energy voltage and output the ground voltage through a ground terminal thereof;

a first unidirectional conduction component connected with the radio frequency circuit and configured to make the ground voltage to be unidirectionally conductive so as to generate a first voltage; and a microprocessor connected with the first unidirectional conduction component and configured to generate a supply voltage according to the first voltage, and is operated according to the supply voltage;

where the microprocessor includes a first input/output port and the first input/output port is provided with a pull-up switch transistor, a capacitance between a gate electrode and a source electrode of the pull-up switch transistor is charged according to the first voltage, and a charging voltage is generated, and the pull-up switch transistor is turned on according to the charging voltage to enable a drain electrode of the pull-up switch transistor to be powered up to generate the supply voltage, and the microprocessor is operated according to the supply voltage;

the first input/output port of the microprocessor is connected with the first unidirectional conduction component.

In one embodiment, the microprocessor further includes a second input/output port connected with the radio frequency circuit;

the microprocessor is further configured to generate a data signal according to the supply voltage and output the data signal through the second input/output port;

the radio frequency circuit is further configured to generate a wireless communication signal according to the data signal and transmit the wireless communication signal over a wireless link.

In one embodiment, the microprocessor is further configured to generate a control signal according to the supply voltage, and the micro-energy acquisition device further includes:

a switch circuit connected with the radio frequency circuit and the first unidirectional conduction component and configured to make the first voltage to be conductive with a power ground according to the control signal;

the microprocessor further includes a third input/output port, and the microprocessor is further configured to output the control signal through the third input/output port.

In one embodiment, the switch circuit includes a first triode and a first resistance;

where a base electrode of the first triode is connected with a first end of the first resistance, a second end of the first resistance is a control signal input of the switch circuit, a collector electrode of the first triode is a first voltage input of the switch circuit, and an emitting electrode of the first triode is connected with the power ground.

In one embodiment, the micro-energy acquisition device further includes:

a second unidirectional conduction component connected with the radio frequency circuit and the first unidirectional conduction component, and configured to make the first voltage to be unidirectionally conductive;

the switch circuit is configured to make the unidirectionally conductive first voltage to be conductive with the power ground according to the control signal.

In one embodiment, the third input/output port of the microprocessor is connected with the radio frequency circuit and the first unidirectional conduction component; the third input/output port of the microprocessor is a pull-down port with a low internal resistance;

the microprocessor is further configured to generate the control signal according to the supply voltage;

the control signal is transmitted through the third input/output port of the microprocessor.

In one embodiment, the micro-energy acquisition device further includes:

a first energy storage element connected with a power terminal of the microprocessor, and configured to store electric energy according to the supply voltage and provide a second voltage;

the microprocessor is further configured to be operated according to the second voltage.

In one embodiment, the first unidirectional conduction component includes a first diode.

In one embodiment, the micro-energy acquisition device further includes:

an indication component connected with the microprocessor and configured to perform an indication according to the micro-energy voltage and an indication signal;

the microprocessor further includes a fourth input/output port and is further configured to output the indication signal through the fourth input/output port after outputting the data signal through the second input/output port.

In one embodiment, the micro-energy acquisition device further includes:

a rectifier circuit connected with the radio frequency circuit and configured to generate an original micro-energy voltage according to an original micro-energy alternating current; and a second energy storage element connected with the radio frequency circuit and the rectifier circuit, and configured to store electric energy according to the original micro-energy voltage and output the micro-energy voltage.

In one embodiment, the rectifier circuit includes a second diode, a third diode, a fourth diode, and a fifth diode;

where a positive electrode of the third diode and a negative electrode of the second diode are served as a first original micro-energy alternating current input of the rectifier circuit, a positive electrode of the fifth diode and a negative electrode of the fourth diode are served as a second original micro-energy alternating current input of the rectifier circuit, a negative electrode of the third diode and a negative electrode of the fifth diode are served as an original micro-energy voltage output of the rectifier circuit, and a positive electrode of the second diode and a positive electrode of the fourth diode are commonly connected with the power ground.

In one embodiment, the radio frequency circuit includes a radio frequency circuit chip, a crystal oscillator, an antenna, a first inductance, a second inductance, a third inductance, a fourth inductance, a second capacitance, a third capacitance, a fourth capacitance, a fifth capacitance and a sixth capacitance;

where a crystal oscillator terminal of the radio frequency circuit chip is connected with a first end of the crystal oscillator; a ground terminal of the radio frequency circuit chip is a ground terminal voltage output of the radio frequency circuit; a data terminal of the radio frequency circuit chip is a data signal input of the radio frequency circuit; a power terminal of the radio frequency circuit chip, a first end of the third capacitance, a first end of the sixth capacitance, and a first end of the first inductance are served as a micro-energy voltage input of the radio frequency circuit; a radio frequency terminal of the radio frequency circuit chip is connected with a second end of the first inductance and a first end of the second capacitance, a second end of the second capacitance is connected with a first end of the second inductance, a second end of the second inductance is connected with a first end of the fourth capacitance and a first end of the third inductance, a second end of the third inductance is connected with a first end of the fifth capacitance, a first end of the fourth inductance, and the antenna; a ground terminal of the radio frequency circuit chip, a second end of the crystal oscillator, a second end of the fourth inductance, a second end of the third capacitance, a second end of the fourth capacitance, a second end of the fifth capacitance, and a second end of the sixth capacitance are commonly connected with a signal ground.

A micro-energy acquisition method is further provided in one embodiment of the present application, the micro-energy acquisition method is based on the aforesaid micro-energy acquisition device, and includes:

powering up and operating the microprocessor of the micro-energy acquisition device;

generating, by a rectifier circuit of the micro-energy acquisition device which is connected with the radio frequency circuit, an original micro-energy voltage according to an original micro-energy alternating current; and storing, by a second energy storage element of the micro-energy acquisition device which is connected with the radio frequency circuit and the rectifier circuit, electric energy according to the original micro-energy voltage, and outputting the micro-energy voltage.

In one embodiment, the micro-energy acquisition method further includes:

transmitting, by the microprocessor, a wake-up pulse to the radio frequency circuit to wake up the radio frequency circuit when the microprocessor determines that the micro-energy voltage has a maximum value;

outputting, by the microprocessor, the control signal to the radio frequency circuit through a third input/output port of the microprocessor to make the radio frequency circuit to be grounded; and transmitting, by the radio frequency circuit, a data packet according to the wake-up pulse.

The micro-energy acquisition device in the embodiments of the present application includes the radio frequency circuit, the first unidirectional conduction component, and the microprocessor; the radio frequency circuit generates the ground voltage according to the micro-energy voltage and output the ground voltage through the ground terminal; the first unidirectional conduction component makes the ground voltage to be unidirectionally conductive so as to generate the first voltage; the microprocessor generates the supply voltage according to the first voltage and is operated according to the supply voltage; where the microprocessor includes the first input/output port which is provided with the pull-up switch transistor, the capacitance between the gate electrode and the source electrode of the pull-up switch transistor is charged according to the first voltage, and the charging voltage is generated, the pull-up switch transistor is turned on according to the charging voltage, so that the drain electrode of the pull-up switch transistor is powered up and the supply voltage is generated, and the microprocessor is operated according to the supply voltage; the first input/output port of the microprocessor is connected with the first unidirectional conduction component; since the microprocessor and the radio frequency circuit are connected in series, an electrical energy consumption speed of the micro-energy voltage is slower, time spent on signal conversion and transmission of wireless communication signal of the radio frequency circuit is greatly prolonged, so that the capability of data transmission is improved and an error rate of data transmission is reduced.

BRIEF DESCRIPTION OF THE DRAWINGS

In order to explain the technical solutions in the embodiments of the present application, a brief introduction regarding the accompanying drawings that need to be used for describing the embodiments or demonstrated technology is given below; it is obvious that the accompanying drawings described below are only some embodiments of the present application, a person of ordinary skill in the art may also obtain other drawings according to the current drawings without paying creative labor.

DESCRIPTION OF THE EMBODIMENTS

In order to make the objective, the technical solutions and the benefits of the present application be clearer, the embodiments of the present application will be further described in detail with reference to the accompanying figures.

Figure 1:
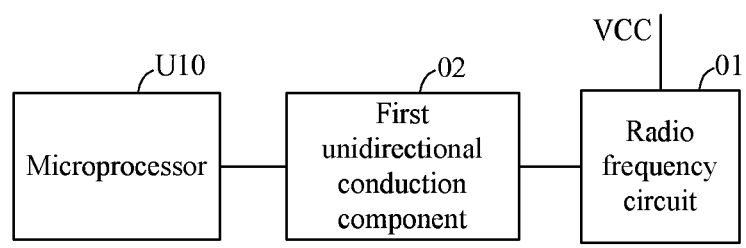
FIG. 1 illustrates one modular structural diagram of a micro-energy acquisition device according to one embodiment of the present application.

FIG. 1 illustrates a modular structure of a micro-energy acquisition device according to one embodiment of the present application, for the convenience of description, the part related to the embodiments of the present application is merely illustrated, and this part is described in detail below:

The micro-energy acquisition device includes a radio frequency circuit 01, a first unidirectional conduction component 02, and a microprocessor U10.

The radio frequency circuit 01 is configured to generate a ground voltage according to the micro-energy voltage VCC and output a ground voltage through the ground terminal; the first unidirectional conduction component 02 is connected with the radio frequency circuit 01 and is configured to enable an unidirectional conduction ground voltage to generate a first voltage; the microprocessor U10 is connected with the first unidirectional conduction component 02 and is configured to generate a supply voltage according to the first voltage and is operated according to the supply voltage.

Figure 2:
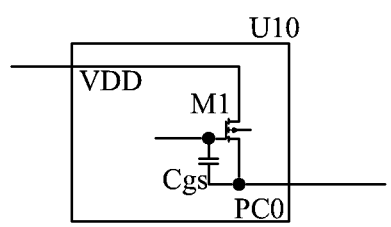
FIG. 2 illustrates a schematic circuit diagram of a microprocessor of the micro-energy acquisition device according to one embodiment of the present application.

As shown in FIG. 2, the microprocessor U10 includes a first input/output port PC0, and a pull-up switch transistor M1 is provided in the first input/output port PC0, a capacitance CGS between a gate electrode and a source electrode of the pull-up switch transistor M1 is charged according to the first voltage to generate a charging voltage, and the pull-up switch transistor M1 is turned on according to the charging voltage to enable a drain electrode of the pull-up switch transistor M1 to be powered up to generate the supply voltage, and the microprocessor U10 is operated according to the supply voltage; the first input/output port PC0 of the microprocessor U10 is connected with the first unidirectional conduction component.

The pull-up switch transistor M1 is turned on according to the charging voltage, so that the drain electrode of the pull-up switch transistor M1 is powered up and generates the supply voltage. The microprocessor U10 is operated according to the supply voltage, which specifically includes: the pull-up switch transistor M1 is turned on according to the charging voltage, the first voltage flows into the drain electrode of the pull-up switch transistor M1 through the source electrode and the gate electrode of the pull-up switch transistor M1 and generates the supply voltage, and the microprocessor U10 provides power supply for the various input/output ports thereof according to the supply voltage.

After the radio frequency circuit 01 is powered up, powering on of a crystal oscillator, parameter configuration, powering on of a phase-locked loop and powering on of a power amplifier are firstly performed, then, signal conversion and transmission of wireless communication signal are performed; as for the micro-energy voltage VCC, since the microprocessor U10 and the radio frequency circuit 01 are connected in series, electric energy consumption of the micro-energy voltage VCC is slower, time spent on signal conversion and transmission of wireless communication signal are greatly prolonged, so that a capability of data transmission is improved, and an error rate of data transmission is reduced. In actual operation, a maintenance time of electric quantity of the micro-energy voltage VCC and code-transmitting time can reach more than 728 µs, which is equivalent to transmission of four data packets.

A certain voltage drop is generated between the ground voltage and the first voltage through the first unidirectional conduction component 02, so that a service time of the micro-energy voltage VCC is further prolonged, the capability of data transmission is improved, and the error rate of data transmission is reduced.

Figure 3:
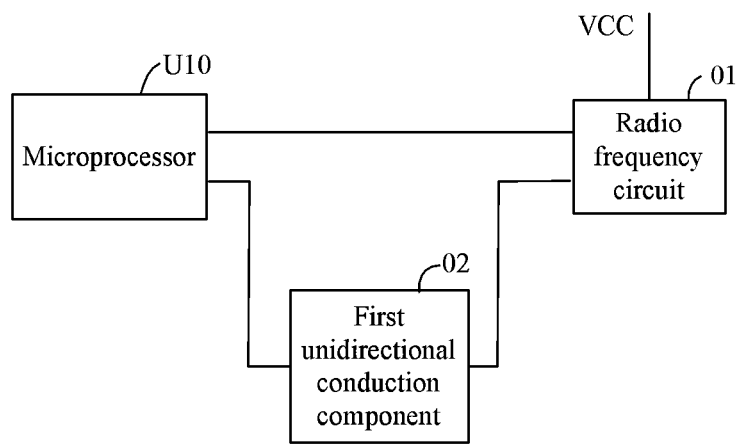
FIG. 3 illustrates another modular structural diagram of the micro-energy acquisition device according to one embodiment of the present application.

As shown in FIG. 3, the second input/output port of the microprocessor U10 is connected with the radio frequency circuit 01; the microprocessor U10 is further configured to generate a data signal according to the supply voltage and output the data signal through the second input/output port; the radio frequency circuit 01 is further configured to generate a wireless communication signal according to the data signal and send the wireless communication signal through a wireless link.

Figure 4:
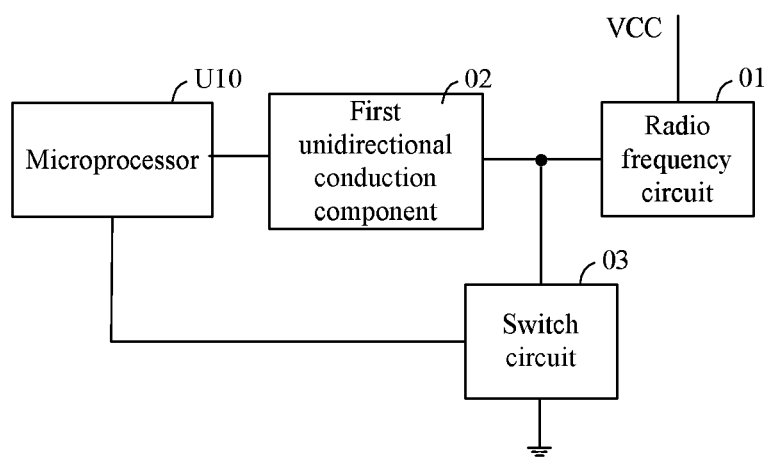
FIG. 4 illustrates another modular structural diagram of the micro-energy acquisition device according to one embodiment of the present application.

As shown in FIG. 4, the micro-energy acquisition device further includes a switch circuit 03.

The switch circuit 03 is connected with the radio frequency circuit 01 and the first unidirectional conduction component 02, and is configured to make the first voltage to be conductive with the power ground according to the control signal; the microprocessor U10 is further configured to generate the control signal according to the supply voltage; and the control signal is output through a third input/output port of the microprocessor U10.

The first voltage is conductive with the power ground through the switch circuit 03, so that the ground terminal of the radio frequency circuit 01 is stabilized at a stable low level, and the stability and the reliability of operation of the radio frequency circuit 01 are improved.

Figure 5:
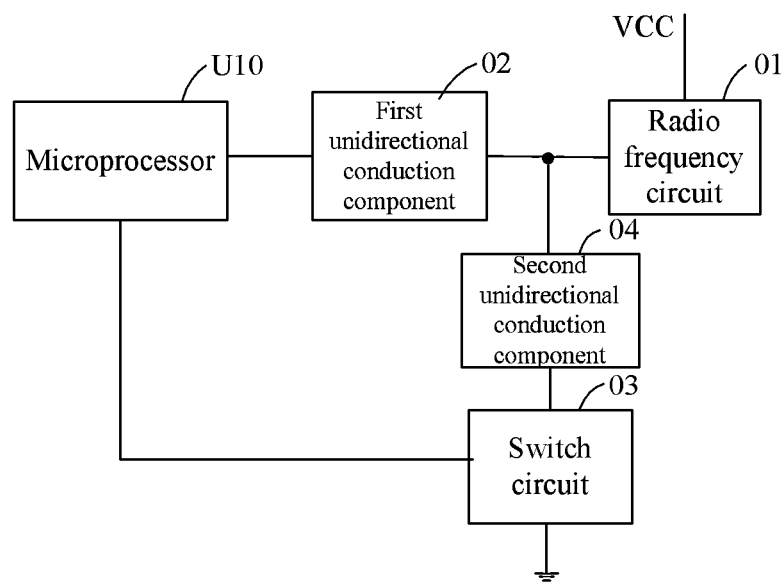
FIG. 5 illustrates another modular structural diagram of the micro-energy acquisition device according to one embodiment of the present application.

As shown in FIG. 5, the micro-energy acquisition device further includes a second unidirectional conduction component 04.

The second unidirectional conduction component 04 is connected with the radio frequency circuit 01 and the first unidirectional conduction component 02, and is configured to make the first voltage to be unidirectionally conductive; and the switch circuit 03 is specifically configured to make the unidirectionally conductive first voltage to be conductive with the power ground according to the control signal.

Figure 6:
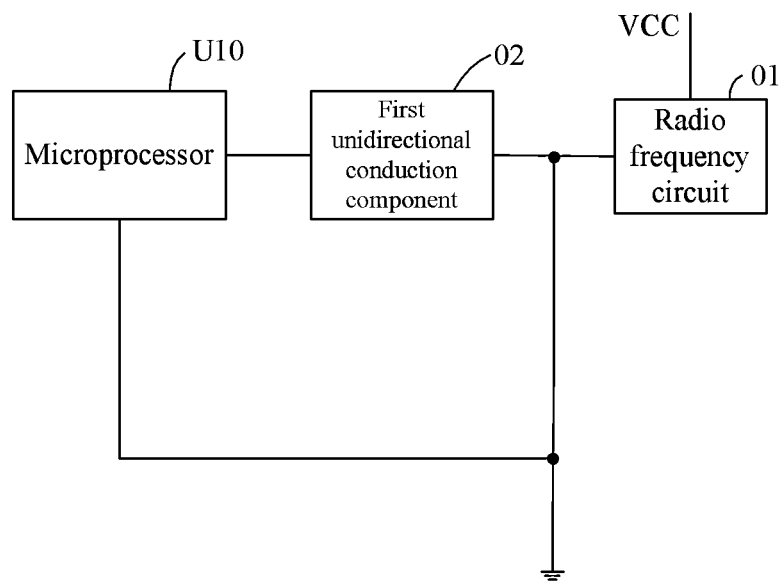
FIG. 6 illustrates another modular structural diagram of the micro-energy acquisition device according to one embodiment of the present application.

As shown in FIG. 6, the third input/output port of the microprocessor U10 is connected with the radio frequency circuit 01 and the first unidirectional conduction component 02; where the third input/output port of the microprocessor U10 is a pull-down port with large current and low internal resistance.

The microprocessor U10 is further configured to generate the control signal according to the supply voltage.

The control signal is output through the third input/output port of the microprocessor U10.

By connecting the third input/output port (i.e., the pull-down port with large current and low internal resistance) of the microprocessor U10 with the radio frequency circuit 01 and the first unidirectional conduction component 02, so that the microprocessor U10 generates the control signal according to the supply voltage, and the first voltage is conductive with the power ground, so that the ground terminal of the radio frequency circuit 01 is stabilized at the stable low level, the stability and the reliability of operation of the radio frequency circuit 01 are improved.

Figure 7:
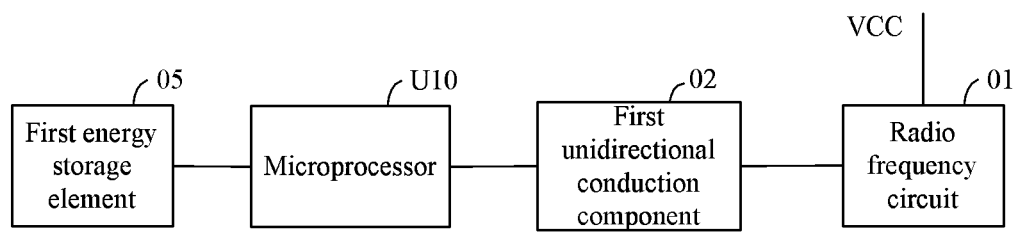
FIG. 7 illustrates another modular structural diagram of the micro-energy acquisition device according to one embodiment of the present application.

As shown in FIG. 7, the micro-energy acquisition device further includes a first energy storage element 05.

Where the first energy storage element 05 is connected with a power terminal of the microprocessor U10, and is configured to store electric energy according to the supply voltage and provide a second voltage; and the microprocessor U10 is further configured to be operated according to the second voltage.

Since the micro-energy voltage VCC appears as an irregular steamed bun waveform, and the first energy storage element 05 stores the electric energy according to the supply voltage and provides the second voltage, powering-on and working time of the microprocessor U10 are improved, the capability of data transmission is improved and the error rate of data transmission is reduced accordingly.

Figure 8:
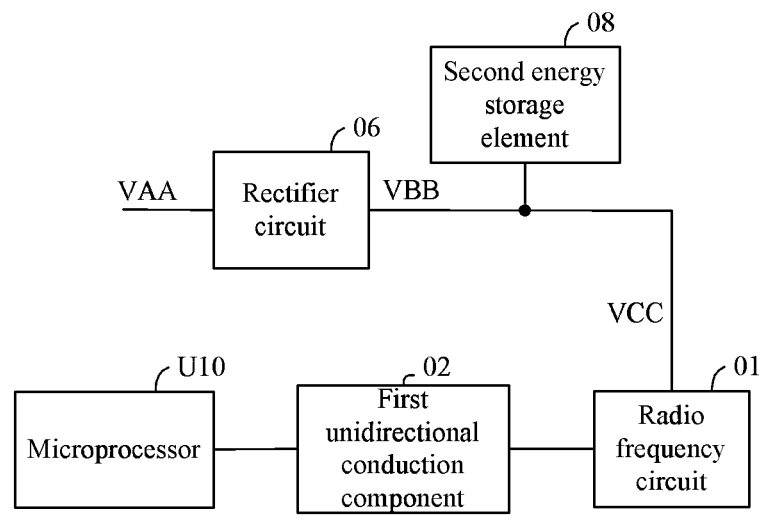
FIG. 8 illustrates another modular structural diagram of the micro-energy acquisition device according to one embodiment of the present application.

As shown in FIG. 8, the micro-energy acquisition device further includes a rectifier circuit 06 and a second energy storage element 08.

The rectifier circuit 06 is connected with the radio frequency circuit 01, and is configured to generate an original micro-energy voltage VBB according to the original micro-energy alternating current VAA.

The second energy storage element 08 is connected with the radio frequency circuit 01 and the rectifier circuit 06, and is configured to store electric energy according to the original micro-energy voltage VBB and output the micro-energy voltage VCC.

Due to the fact that the micro-energy voltage VCC is generated by the rectifier circuit 06 and the second energy storage element 08 according to the original micro-energy alternating current VAA, so that the stability of the micro-energy voltage VCC is improved, and the stability and the reliability of the micro-energy acquisition device are improved.

Figure 9:
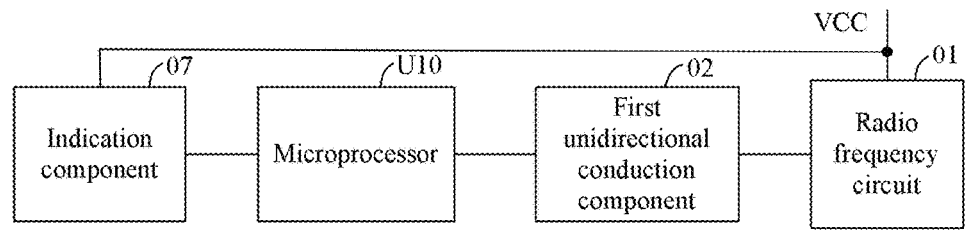
FIG. 9 illustrates another modular structural diagram of the micro-energy acquisition device according to one embodiment of the present application.
Figure 10:
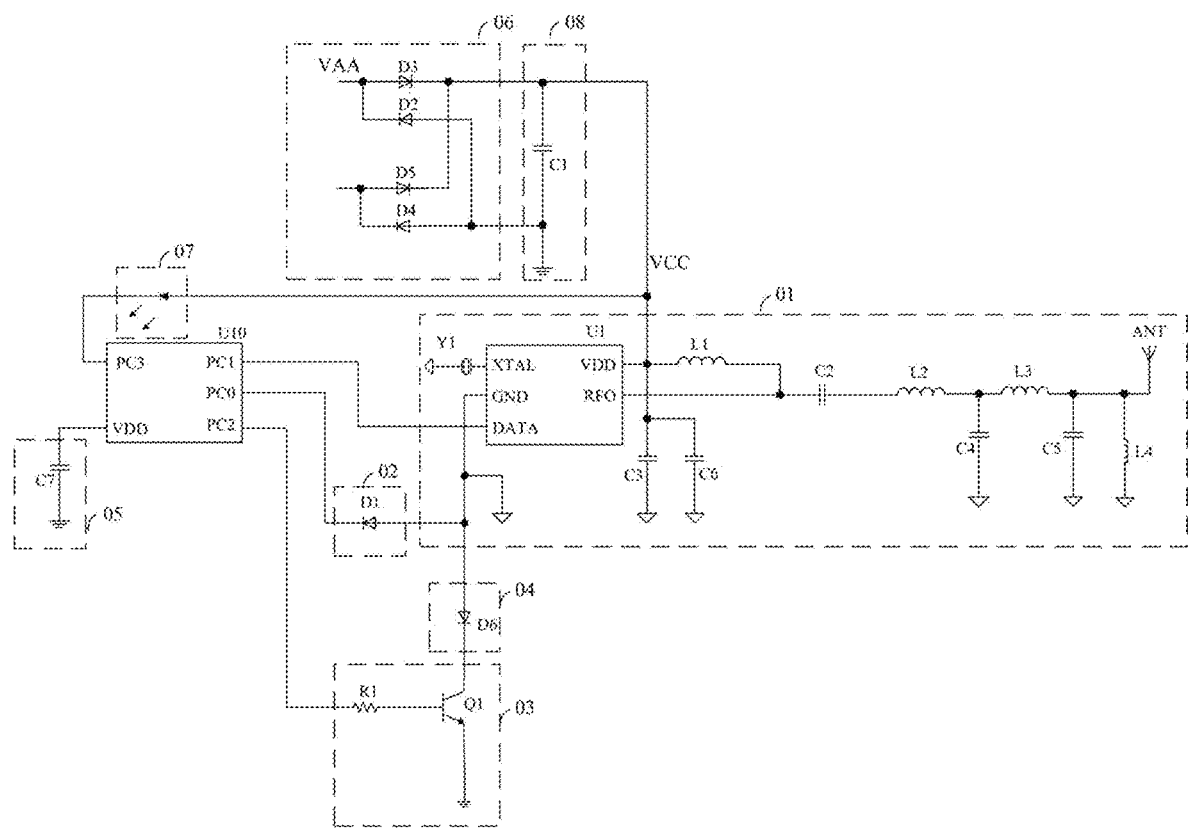
FIG. 10 illustrates an exemplary circuit configuration diagram of the micro-energy acquisition device according to one embodiment of the present application.

As shown in FIG. 9, the micro-energy acquisition device further includes an indication component 07.

Where the indication component 07 is connected with the microprocessor U10, and is configured to perform indication according to the micro-energy voltage and an indication signal. The microprocessor U10 is further configured to output the indication signal through a fourth input/output port thereof after outputting the data signal through the second input/output port.

FIG. 9 illustrates an exemplary circuit configuration of the micro-energy acquisition device according to one embodiment of the present application, for the convenience of description, a part related to the embodiments of the present application is only shown, the part related to the embodiments of the present application is described in detail below:

The switch circuit 03 includes a first triode Q1 and a first resistance R1;

A base electrode of the first triode Q1 is connected with a first end of the first resistance R1, a second end of the first resistance R1 is the control signal input of the switch circuit 03, a collector electrode of the first triode Q1 is the first voltage input of the switch circuit 03, and an emitting electrode of the first triode Q1 is connected with the power ground.

The first unidirectional conduction component 02 includes a first diode D1.

The rectifier circuit 06 includes a second diode D2, a third diode D3, a fourth diode D4, a fifth diode D5, and a first capacitance C1.

A positive electrode of the third diode D3 and a negative electrode of the second diode D2 are served as a first original micro-energy alternating current VAA input of the rectifier circuit 06, a negative electrode of the fifth diode D5 and a negative electrode of the fourth diode D4 are served as a second original micro-energy alternating current VAA input of the rectifier circuit 06, a negative electrode of the third diode D3 and a negative electrode of the fifth diode D5 are served as a micro-energy voltage VCC output of the rectifier circuit 06, a positive electrode of the second diode D2 and a positive electrode of the fourth diode D4 are commonly connected with the power ground.

The second energy storage element 08 includes the first capacitance C1.

The radio frequency circuit 01 includes a radio frequency circuit chip U1, a crystal oscillator Y1, an antenna ANT, a first inductance L1, a second inductance L2, a third inductance L3, a fourth inductance L4, a second capacitance C2, a third capacitance C3, a fourth capacitance C4, a fifth capacitance C5, and a sixth capacitance C6.

Where a crystal oscillator terminal XTAL of the radio frequency circuit chip U1 is connected with a first end of the crystal oscillator Y1; a ground terminal GND of the radio frequency circuit chip U1 is a ground terminal voltage output of the radio frequency circuit 01; a data terminal DATA of the radio frequency circuit chip U1 is a data signal input of the radio frequency circuit 01; a power terminal VDD of the radio frequency circuit chip 01, a first end of the third capacitance C3, a first end of the sixth capacitance C6, and a first end of the first inductance L1 are served as a micro-energy voltage VCC input of the radio frequency circuit 01; a radio frequency terminal RFO of the radio frequency circuit chip is connected with a second end of the first inductance L1 and a first end of the second capacitance C2; a second end of the second capacitance C2 is connected with a first end of the second inductance L2, a second end of the second inductance L2 is connected with a first end of the fourth capacitance C4 and a first end of the third inductance L3, a second end of the third inductance L3 is connected with a first end of the fifth capacitance C5, a first end of the fourth inductance L4, and the antenna ANT; a ground terminal GND of the radio frequency circuit chip U1, a second end of the crystal oscillator Y1, a second end of the fourth inductance L4, a second end of the third capacitance C3, a second end of the fourth capacitance C4, a second end of the fifth capacitance C5, and a second end of the sixth capacitance C6 are commonly connected with a signal ground.

The first input/output port PC0 of the microprocessor U 10 is a first voltage input of the microprocessor U 10; the second input/output port PC1 of the microprocessor U10 is a data signal output of the microprocessor U 10, and the third input/output port PC2 of the microprocessor U10 is a control signal output of the microprocessor U10.

The second unidirectional conduction component 04 includes a sixth diode D6.

The first energy storage element 05 includes a seventh capacitance C7.

The circuit configuration shown in FIG. 9 and FIG. 2 is further described below with reference to the working principle of the micro-energy acquisition device:

The original micro-energy alternating current VAA is rectified to generate the original micro-energy voltage through the second diode D2, the third diode D3, the fourth diode D4 and the fifth diode D5, and the first capacitance C1 stores the electric energy according to the original micro-energy voltage and outputs the micro-energy voltage VCC; the micro-energy voltage VCC is input into the power terminal VDD of the radio frequency circuit chip U1, the radio frequency circuit chip U1 generates the ground voltage according to the micro-energy voltage VCC and outputs the ground voltage through the ground terminal GND of the radio frequency circuit chip U1; the first diode D1 makes the ground voltage to be unidirectionally conductive and generates the first voltage; the microprocessor U10 generates the supply voltage according to the first voltage and is operated according to the supply voltage; where the microprocessor U10 includes the first input/output port which is provided with the pull-up switch transistor M1, the capacitance CGS between the gate electrode and the source electrode of the pull-up switch transistor M1 is charged according to the first voltage to generate the charging voltage, and the pull-up switch transistor M1 is turned on according to the charging voltage, so that the drain electrode of the pull-up switch transsistor M1 is powered up, the supply voltage is generated, and the microprocessor U10 is operated according to the supply voltage. The microprocessor U10 generates the control signal according to the supply voltage, and the control signal is output through the third input/output port of the microprocessor U10. The first transistor Q1 makes the first voltage to be conductive with the power ground according to the control signal, so that the voltage of the ground terminal GND of the radio frequency circuit chip U1 is stabilized at the low level; furthermore, the microprocessor U10 generates the data signal according to the supply voltage, and outputs the data signal through the second input/output port; the data signal is received at the data terminal DATA of the radio frequency circuit chip U1, and the radio frequency circuit 01 generates the wireless communication signal according to the data signal and transmits the wireless communication signal over the wireless link.

A micro-energy acquisition method is further provided in the present invention. Based on the micro-energy acquisition device, the micro-energy acquisition method includes the following steps 301-304.

At step 301, the microprocessor is powered up.

At step 302, when the microprocessor U10 determines that the micro-energy voltage has the maximum value, a wake-up pulse is sent to the radio frequency circuit 01, and the control signal is output through the third input/output port of the microprocessor U10.

When the microprocessor U10 determines that the micro-energy voltage has the maximum value, that is, when there is a greatest energy density of the micro-energy voltage, the wake-up pulse is sent through the second input/output port of the microprocessor U10 to the radio frequency circuit chip U1 to wake up the radio frequency circuit chip U1, and the control signal is output through the third input/output port of the microprocessor U10 to enable the first voltage to be conductive with the power ground, so that the ground terminal of the radio frequency circuit 01 is kept at a stable low level, and the stability and the reliability of operation of the radio frequency circuit 01 are improved accordingly.

At step 304, the radio frequency circuit 01 transmits a data packet according to the wake-up pulse.

There are two conditions in step 304. In the first condition, the microprocessor U10 sends the data packet to the radio frequency circuit 01, and the radio frequency circuit 01 forwards the data packet according to the wake-up pulse. In the second condition, the radio frequency circuit 01 sends the data packet directly according to the wake-up pulse.

The micro-energy acquisition device in the embodiments of the present application includes the radio frequency circuit, the first unidirectional conduction component, and the microprocessor; the radio frequency circuit generates the ground voltage according to the micro-energy voltage and output the ground voltage through the ground terminal; the first unidirectional conduction component makes the ground voltage to be unidirectionally conductive to generate the first voltage; the microprocessor U10 generates the supply voltage according to the first voltage and is operated according to the supply voltage; where the microprocessor U10 includes the first input/output port, the pull-up switch transistor M1 is provided in the first input/output port, the capacitance between the gate electrode and the source electrode of the pull-up switch transistor M1 is charged according to the first voltage and the charging voltage is generated, the pull-up switch transistor M1 is turned on according to the charging voltage, so that the drain electrode of the pull-up switch transsistor M1 is powered up, the supply voltage is generated, and the microprocessor U10 is operated according to the supply voltage; the first input/output port of the microprocessor U10 is connected with the first unidirectional conduction component 02; since the microprocessor U10 and the radio frequency circuit 01 are connected in series, an electrical energy consumption speed of the micro-energy voltage is slower, time spent on signal conversion and transmission of wireless communication signal of the radio frequency circuit 01 is greatly prolonged, so that the capability of data transmission is improved and an error rate of data transmission is reduced.

The foregoing embodiments are only preferable embodiments of the present application, and should not be regarded as limitations to the present application. All modifications, equivalent replacements and improvements, which are made within the spirit and the principle of the present application, should all be included in the protection scope of the present application.

What is claimed is:

1. A micro-energy acquisition device, comprising:
   a radio frequency circuit configured to generate a ground voltage according to a micro-energy voltage and output the ground voltage through a ground terminal;

a first unidirectional conduction component connected with the radio frequency circuit and configured to make the ground voltage to be unidirectionally conductive so as to generate a first voltage; and a microprocessor connected with the first unidirectional conduction component and configured to generate a supply voltage according to the first voltage, and is operated according to the supply voltage;

wherein the microprocessor comprises a first input/output port and the first input/output port is provided with a pull-up switch transistor, a capacitance between a gate electrode and a source electrode of the pull-up switch transistor is charged according to the first voltage, and a charging voltage is generated, and the pull-up switch transistor is turned on according to the charging voltage to enable a drain electrode of the pull-up switch transistor to be powered up to generate the supply voltage, and the microprocessor is operated according to the supply voltage;

the first input/output port of the microprocessor is connected with the first unidirectional conduction component.

2. The micro-energy acquisition device of claim 1, wherein the microprocessor further comprises a second input/output port connected with the radio frequency circuit;

the microprocessor is further configured to generate a data signal according to the supply voltage and output the data signal through the second input/output port;

the radio frequency circuit is further configured to generate a wireless communication signal according to the data signal and transmit the wireless communication signal over a wireless link.

3. The micro-energy acquisition device of claim 1, wherein the microprocessor is further configured to generate a control signal according to the supply voltage, and the micro-energy acquisition device further comprises:

a switch circuit connected with the radio frequency circuit and the first unidirectional conduction component and configured to make the first voltage to be conductive with a power ground according to the control signal;

the microprocessor further comprises a third input/output port, and the microprocessor is further configured to output the control signal through the third input/output port.

4. The micro-energy acquisition device of claim 3, wherein the switch circuit comprises a first triode and a first resistance;

wherein a base electrode of the first triode is connected with a first end of the first resistance, a second end of the first resistance is a control signal input of the switch circuit, a collector electrode of the first triode is a first voltage input of the switch circuit, and an emitting electrode of the first triode is connected with the power ground.

5. The micro-energy acquisition device of claim 3, further comprising:

a second unidirectional conduction component connected with the radio frequency circuit and the first unidirectional conduction component, and configured to make the first voltage to be unidirectionally conductive;

the switch circuit is configured to make the unidirectionally conductive first voltage to be conductive with the power ground according to the control signal.

6. The micro-energy acquisition device of claim 3, wherein the third input/output port of the microprocessor is connected with the radio frequency circuit and the first unidirectional conduction component; the third input/output port of the microprocessor is a pull-down port with a low internal resistance;

the microprocessor is further configured to generate the control signal according to the supply voltage;

and the control signal is transmitted through the third input/output port of the microprocessor.

7. The micro-energy acquisition device of claim 1, further comprising:

a first energy storage element connected with a power terminal of the microprocessor, and configured to store electric energy according to the supply voltage and provide a second voltage;

and the microprocessor is further configured to be operated according to the second voltage.

8. The micro-energy acquisition device of claim 1, wherein the first unidirectional conduction component comprises a first diode.

9. The micro-energy acquisition device of claim 2, further comprising:

an indication component connected with the microprocessor and configured to perform an indication according to the micro-energy voltage and an indication signal;

the microprocessor further comprises a fourth input/output port and is further configured to output the indication signal through the fourth input/output port after outputting the data signal through the second input/output port.

10. The micro-energy acquisition device of claim 1, further comprising:

a rectifier circuit connected with the radio frequency circuit and configured to generate an original micro-energy voltage according to an original micro-energy alternating current; and a second energy storage element connected with the radio frequency circuit and the rectifier circuit, and configured to store electric energy according to the original micro-energy voltage and output the micro-energy voltage.

11. The micro-energy acquisition device of claim 10, wherein the rectifier circuit comprises a second diode, a third diode, a fourth diode, and a fifth diode;

wherein a positive electrode of the third diode and a negative electrode of the second diode are served as a first original micro-energy alternating current input of the rectifier circuit, a positive electrode of the fifth diode and a negative electrode of the fourth diode are served as a second original micro-energy alternating current input of the rectifier circuit, a negative electrode of the third diode and a negative electrode of the fifth diode are served as an original micro-energy voltage output of the rectifier circuit, and a positive electrode of the second diode and a positive electrode of the fourth diode are commonly connected with a power ground.

12. The micro-energy acquisition device of claim 1, wherein the radio frequency circuit comprises a radio frequency circuit chip, a crystal oscillator, an antenna, a first inductance, a second inductance, a third inductance, a fourth inductance, a second capacitance, a third capacitance, a fourth capacitance, a fifth capacitance and a sixth capacitance;

wherein a crystal oscillator terminal of the radio frequency circuit chip is connected with a first end of the crystal oscillator; a ground terminal of the radio frequency circuit chip is a ground terminal voltage output of the radio frequency circuit; a data terminal of the radio frequency circuit chip is a data signal input of the radio frequency circuit; a power terminal of the radio frequency circuit chip, a first end of the third capacitance, a first end of the sixth capacitance, and a first end of the first inductance are served as a micro-energy voltage input of the radio frequency circuit; a radio frequency terminal of the radio frequency circuit chip is connected with a second end of the first inductance and a first end of the second capacitance, a second end of the second capacitance is connected with a first end of the second inductance, a second end of the second inductance is connected with a first end of the fourth capacitance and a first end of the third inductance, a second end of the third inductance is connected with a first end of the fifth capacitance, a first end of the fourth inductance, and the antenna; a ground terminal of the radio frequency circuit chip, a second end of the crystal oscillator, a second end of the fourth inductance, a second end of the third capacitance, a second end of the fourth capacitance, a second end of the fifth capacitance, and a second end of the sixth capacitance are commonly connected with a signal ground.

13. A micro-energy acquisition method based on the micro-energy acquisition device according to claim 1, the micro-energy acquisition method comprising:

powering up and operating the microprocessor of the micro-energy acquisition device;

generating, by a rectifier circuit of the micro-energy acquisition device, an original micro-energy voltage according to an original micro-energy alternating current; and storing, by a second energy storage element of the micro-energy acquisition device which is connected with the radio frequency circuit and the rectifier circuit, electric energy according to the original micro-energy voltage and outputting the micro-energy voltage.

14. The micro-energy acquisition method of claim 13, further comprising:

transmitting, by the microprocessor, a wake-up pulse to the radio frequency circuit to wake up the radio frequency circuit when the microprocessor determines that the micro-energy voltage has a maximum value, and outputting, by the microprocessor, a control signal to the radio frequency circuit through a third input/output port of the microprocessor to make the radio frequency circuit to be grounded; and transmitting, by the radio frequency circuit, a data packet according to the wake-up pulse.

* * * * *